United States Patent [19]

Kutzler

[11] Patent Number: 4,457,416
[45] Date of Patent: Jul. 3, 1984

[54] LASHLESS SOCKET DRIVE

[76] Inventor: James W. Kutzler, 4 Broadway Sp 06, Chula Vista, Calif. 92010

[21] Appl. No.: 337,656

[22] Filed: Jan. 7, 1982

[51] Int. Cl.³ ............................................. F16D 15/00
[52] U.S. Cl. ........................................ 192/44; 81/63.1
[58] Field of Search ...................... 192/44; 145/70, 76; 81/59.1, 63.1, 474

[56] References Cited

U.S. PATENT DOCUMENTS

| 2,003,155 | 5/1935 | Pfauser | 81/59.1 |
| 2,970,489 | 2/1961 | Eason | 192/44 |
| 3,119,480 | 1/1964 | Fuchs | 192/44 |
| 3,362,267 | 1/1968 | Rozmus | 81/59.1 |
| 3,586,143 | 6/1971 | Hutchinson | 192/44 |
| 4,051,935 | 10/1977 | Nakayama | 192/44 |

Primary Examiner—Rodney H. Bonck
Assistant Examiner—James J. Merek
Attorney, Agent, or Firm—Ralph S. Branscomb

[57] ABSTRACT

A socket wrench drive is provided in which an inclined bearing drive mechanism is used, this mechanism being reversible by selectively maintaining one or the other set of bearings in non-wedging position with a special keeper while the other set is permitted to wedge.

3 Claims, 8 Drawing Figures

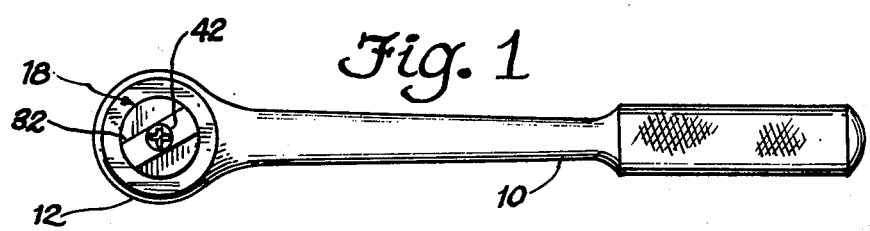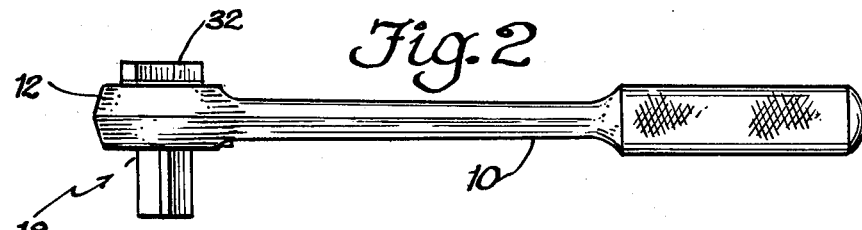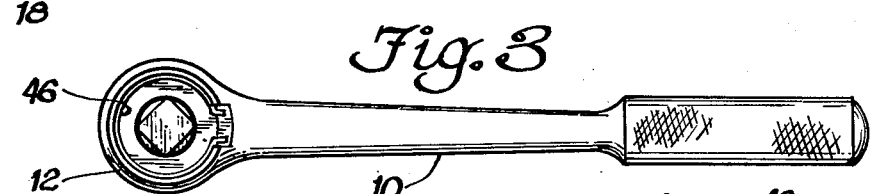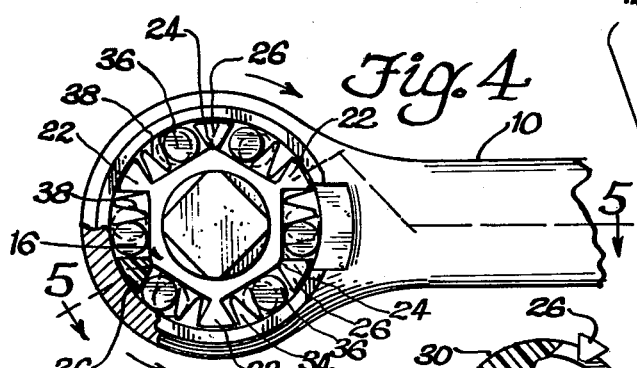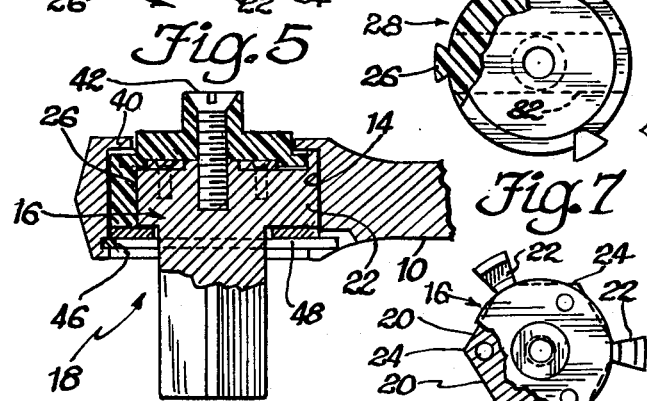

LASHLESS SOCKET DRIVE

BACKGROUND OF THE INVENTION

Socket wrenches have evolved from the days when each wrench was separately cast to the present time in which virtually all socket wrenches contain interchangeable snap-on socket elements which can be snapped onto various drives, extensions, universal joints, etc. The strength and reliability of modern socket sets stands testimony to technology at its most practical manifestation.

Despite the strength and reliability of the sockets and, in particular, reversible ratchet drives, several problems remain persistent in the art. One of these is the rather lengthy lash or play that the socket is subject to between clicks of the ratchet. This varies between manufacturers, but a play of 30° between clicks is not uncommon.

The effect of using a wrench with such high lash is trivial if the user is working in an area where a full 360° rotation, or a major part thereof, can be achieved. However, as the working area narrows to the point where each sweep of the drive handle can only effect one ratchet click, labor becomes inefficient and frustrating to the mechanic.

There are some situations in which obstructions surrounding the bolt permit perhaps 10° or 15° of throw of the drive handle. Obviously, where the play is 30°, such a wrench simply will not work.

There is a need, therefore, for a wrench with no play, or play that is so small as to be insignificant, on the order of 1° or less. Wrenches have been developed with this aim in mind, some of them utilizing inclined plane and roller bearings much as does the instant wrench. A sampling of these include those disclosed in U.S. Pat. Nos. 835,448; 1,136,821; 1,655,865; 1,904,621; 3,679,031. Although these inventions, dating back to the turn of the century, probably work quite well, they have in common a rather complicated character requiring expensive machining and in some cases appear as though strength might be a problem.

It is the intent of applicant, therefore, to provide a wrench that is strong, extremely simple to produce and assemble, is economical due to the absence of expensive tooling, and utilizes the bearing and ramp construction which for all intents and purposes is lash-free.

SUMMARY OF THE INVENTION

The wrench of the instant invention utilizes a handle with the head end defining a cylindrical chamber, the cylindrical wall of which also defines the outside of the ramp space in which the roller bearings operate. Inside this chamber is a second member which forms a rotor having a hexagonal side wall to define suitable ramps. The rotor member also has baffles which establish three discrete ramp spaces which house roller bearings and springs, and the third major element of the wrench is a spider-like keeper having fingers which snap over the vertices of the hexagon to selectably establish one set of rollers or the other set of rollers as being those rollers that wedge in the ramp space, with the other set being held out of the wedging position by the fingers.

DETAILED DESCRIPTION OF THE DRAWINGS

FIG. 1 is a top elevation view of an assembled driver;

FIG. 2 is a side elevation view of the assembled driver;

FIG. 3 is the bottom elevation view of the assembled driver;

FIG. 4 is an elevational detail of the wrench head with the plate removed revealing the bearings and ramp spaces with their associated structure;

FIG. 5 is a sectional view taken along line 5—5 of FIG. 4;

FIG. 6 is an exploded view of the wrench taken apart, portions of which are shown in perspective; and FIGS. 7 and 8 are sections, partially cut away, taken along the respective sectioning lines in FIG. 6.

DETAILED DESCRIPTION OF THE PREFERRED EMBODIMENT

The socket drive includes a long handle 10 which terminates in the driving head 12 which defines a generally cylindrical chamber 14. As will become clear below, this cylindrical chamber could also be annular and act as a ball race for ball bearings rather than serving to capture roller bearings as in the instant disclosure. For this reason, the bearings and the chamber are recited in the claims as being circular rather than cylindrical.

Disposed within this cylindrical chamber is a rotor 16, which is part of a drive member 18 which is driven by the driving head 12 of the first member. The rotor 16 rotates relative to the chamber 14, and is generally hexagonal as is best shown in FIG. 4. Each adjacent pair of hexagonal faces 20 is separated from the other adjacent pairs by baffles 22 which in the illustrated embodiment are molded integrally with the rotor. At the confluence of the two planes which define the plane pairs is a vertex 24, which in the preferred embodiment acts as a snap-over bearing surface for the fingers 26 of the keeper 28. This keeper, detailed in FIG. 7, has a generally circular planar body 30 on which the fingers 26 extend. The back side of the planar body mounts a ridge 32, which is integral with the reset of the keeper and enables the user to snap the keeper back and forth, alternatively snapping the fingers 26 onto opposite sides of their respective vertices 24.

The flat faces 20 define ramps, which together with the interior cylindrical wall of the chamber 14, define converging ramps spaces 34. These ramp spaces confine roller bearings 36 which are provided two per ramp space and are urged toward the respective vertices 24 by springs 38 which in the preferred embodiment are convoluted leaf springs buttressed by the baffles 22.

As best seen in FIG. 4, once the keeper 28 is snapped into the position shown in that Figure, the wrench will operate in the counterclockwise direction. The keeper will hold three of the six roller bearings out of wedging engagement in the ramp spaces, and the other three bearings, being those on the clockwise side of vertices, will be rolled in the counterclockwise direction by the chamber 14 and wedged against their respective ramps short of the vertices 24. To operate in the clockwise fashion, the keeper is twisted to snap the fingers 26 over the vertices to hold the other set of three roller bearings clear of wedging engagement in their ramp spaces.

Merely by suitably dimensioning the fingers 26 and the space between the vertices 24 and the interior wall of the chamber 14, the selectable reverse action is created as an inherent feature of the design. No complicated detents or secondary springs or catches are needed. This action lies at the heart of the simplicity of the invention. Although other over-the-center actions could be incorporated at different places between the keeper and the driven member of the combination, nevertheless, the three fingered "spider" is a simple and effective means of shifting the bearings with a minimum of complication.

Another advantage of the preferred embodiment is the presence of a neutral position. The vertices 24 are actually flat enough (and could even be slightly concave, or the fingers could be concave) that the finger will align with the vertices, eliminating the ratchet-type action and provide positive action both ways.

It would also be possible to switch the roles of the driving and driven member, that is, the chamber 14 can be found in the socket engaging member, although this would almost certainly be less desirable in view of the general nature of the wrench. Also, clearly other arrangements of the details of construction are conceivable within the scope of the invention, but the following parts enable the specific combination disclosed to operate effectively.

At the back of the cylindrical chamber is an annular partial wall 40 which captures the keeper 28 as can be seen in FIG. 5. The keeper in turn rotatably connects to the rotor 16 of the driven member by means of a screw 42. The entire structure is held together by virtue of an annular groove 44 which seats retainer 46 which holds retainer washer 48 in place.

Thus, with a few simple parts that can be assembled very straightforwardly and quickly, the lash-free action described above is achieved at a production cost which is not significantly greater than that of producing a high-quality ratchet-type wrench. The strength of the bearing and ramp construction is quite high and by its nature would generally be higher than that of a ratchet, as there is no single axis such as there is in a ratchet element which takes all of the force applied against the wrench. For these reasons, this simple, economical, and extremely strong wrench should provide a valuable addition of the tool chest of many mechanics.

While I have described the preferred embodiment of the invention, other embodiments may be devised and different uses may be achieved without departing from the spirit and scope of the appended claims.

What is claimed is:

1. A reversible, unidirectional drive mechanism comprising:
   (a) a driving member;
   (b) a driven member;
   (c) one of said members defining a substantially circular chamber with a circular wall and other member having a rotor internally of said chamber;
   (d) said rotor defining ramps and having a plurality of radial baffles which define therebetween discrete ramp spaces bordered on opposite sides by said chamber wall and said ramps;
   (e) each of said ramp spaces including two contiguous ramps meeting at a vertex and defining convergent ramp spaces toward said vertex;
   (f) a circular bearing for each ramp and including means urging same toward said vertex; and
   (g) a keeper mounting a finger for each vertex and said fingers being dimensioned and positioned to concomitantly snap past said vertices with an over-the-center action, selectably to the clockwise or counter-clockwise sides thereof to hold the respective bearings away from said vertices and out of wedging engagement in said ramp spaces, whereby said fingers and vertices together double as the reverse mechanism, and as an over-the-center detent mechanism to hold the drive mechanism in the selected mode.

2. Structure according to claim 1 wherein said keeper defines an externally accessible unitary grip actuable to snap said fingers over said vertices, said keeper, keeper fingers, and grip being unitarily constructed as a single piece.

3. Structure according to claim 1 wherein said vertices and fingers are complimentarily shaped to permit said fingers to frictionally engage and rest thereon to throw the mechanism into a neutral mode.

* * * * *